United States Patent
Wang (10) Patent No.: US 11,327,654 B2
(45) Date of Patent: May 10, 2022

(54) METHOD AND DEVICE FOR BASEBOARD MANAGEMENT CONTROLLER MOUNTING FOLDER WITH KVM

(71) Applicant: ZHENGZHOU YUNHAI INFORMATION TECHNOLOGY CO., LTD., Henan (CN)

(72) Inventor: Xuelong Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 424 days.

(21) Appl. No.: 16/475,103

(22) PCT Filed: Aug. 31, 2018

(86) PCT No.: PCT/CN2018/103405
§ 371 (c)(1),
(2) Date: Jun. 30, 2019

(87) PCT Pub. No.: WO2019/148830
PCT Pub. Date: Aug. 8, 2019

(65) Prior Publication Data
US 2021/0382623 A1    Dec. 9, 2021

(30) Foreign Application Priority Data
Feb. 2, 2018   (CN) .......................... 201810106175

(51) Int. Cl.
*G06F 3/06* (2006.01)
*G06F 11/07* (2006.01)
*G06F 11/20* (2006.01)

(52) U.S. Cl.
CPC .......... *G06F 3/0605* (2013.01); *G06F 3/0614* (2013.01); *G06F 3/0631* (2013.01);
(Continued)

(58) Field of Classification Search
CPC .... G06F 3/0605; G06F 3/0614; G06F 3/0617; G06F 3/0631; G06F 3/0635;
(Continued)

(56) References Cited

U.S. PATENT DOCUMENTS

| 9,575,784 B1 | 2/2017 | Aron et al. |
| 2013/0304705 A1 | 11/2013 | Wong |

(Continued)

FOREIGN PATENT DOCUMENTS

| CN | 101140589 A | * | 3/2008 |
| CN | 101140589 A | | 3/2008 |

(Continued)

OTHER PUBLICATIONS

The 2nd Office Action regarding Chinese Patent Application No. CN201810106175.9, dated Jul. 28, 2021. English Translation Provided by http://globaldossier.uspto.gov.
(Continued)

*Primary Examiner* — Gary J Portka
(74) *Attorney, Agent, or Firm* — Yue (Robert) Xu; Apex Attorneys at Law, LLP (57) ABSTRACT

A method for a baseboard management controller mounting a folder with KVM includes following steps. A first size of a to-be-mounted folder is calculated. A second size of a mirror image file corresponding to the to-be-mounted folder is calculated based on the first size. A default storage path is allocated for the mirror image file, and it is obtained a remaining storage capacity of a disk where the default storage path is located. If the remaining storage capacity is less than the second size, a prompt dialog box, for selecting a user storage path for the mirror image file, is displayed to the user. If the remaining storage capacity of the disk where
(Continued)

the default storage path or the user storage path is located is greater than the second size, the to-be-mounted folder is mounted to a server.

12 Claims, 4 Drawing Sheets

(52) U.S. Cl.
CPC .......... *G06F 3/0635* (2013.01); *G06F 3/0638* (2013.01); *G06F 3/0674* (2013.01); *G06F 11/0727* (2013.01); *G06F 11/2087* (2013.01)

(58) Field of Classification Search
CPC .... G06F 3/0638; G06F 3/0644; G06F 3/0674; G06F 3/0683; G06F 3/0689; G06F 11/0727; G06F 11/2087
USPC ................................. 711/154, 170, 171, 172
See application file for complete search history.

(56) References Cited

U.S. PATENT DOCUMENTS

| 2015/0207904 | A1 | 7/2015 | Siegman et al. | |
|---|---|---|---|---|
| 2015/0295994 | A1* | 10/2015 | Siegman | H04L 67/42 709/203 |

FOREIGN PATENT DOCUMENTS

| CN | 101847101 | A | | 9/2010 |
|---|---|---|---|---|
| CN | 103020223 | A | | 4/2013 |
| CN | 103677945 | A | | 3/2014 |
| CN | 103927215 | A | | 7/2014 |
| CN | 105589964 | A | * | 5/2016 |
| CN | 105589964 | A | | 5/2016 |
| CN | 105893198 | A | | 8/2016 |
| CN | 106095528 | A | | 11/2016 |
| CN | 106708430 | A | | 5/2017 |
| CN | 108319524 | A | | 7/2018 |

OTHER PUBLICATIONS

The 1st Office Action regarding Chinese Patent Application No. CN201810106175.9, dated Sep. 24, 2020. English Translation Provided by http://globaldossier.uspto.gov.

Hao Shan, Exploration application of NFS Automatic Mount Service in Enterprise Information Platform, Electronic production, No. 10, Jul. 26, 2013, p. 115.

International Search Report for PCT/CN2018/103405 dated Nov. 23, 2018, ISA/CN.

* cited by examiner

METHOD AND DEVICE FOR BASEBOARD MANAGEMENT CONTROLLER MOUNTING FOLDER WITH KVM

This application is a national phase application of PCT international patent application PCT/CN2018/103405, filed on Aug. 31, 2018 which claims the priority to Chinese Patent Application No. 201810106175.9, titled "METHOD AND DEVICE FOR BASEBOARD MANAGEMENT CONTROLLER MOUNTING FOLDER WITH KVM", filed on Feb. 2, 2018 with the China National Intellectual Property Administration, both of which are incorporated herein by reference in their entireties.

FIELD

The present disclosure relates to the field of KVM technology, particularly to a method, a device, an apparatus and a computer readable storage medium for a baseboard management controller mounting a folder with KVM.

BACKGROUND

BMC (baseboard management controller) is a controller that provides intelligent management under IPMI (Intelligent Platform Management Interface) structure. The BMC has its own power supply and can automatically obtain information such as temperature, voltage, fan, power consumption, power information and CPU memory status to monitor a health status of a system. Furthermore, the BMC supports interfaces such as IPMI, Restful, Redfish, SNMP, SMTP, and supports Web UI access and IPMI command access.

With the rapid development of server technology, BMC can remotely login a server to realize remote control of the server with KVM (Keyboard Video Mouse), which is a virtual technology of remotely controlling a server. In order to conveniently use various resources on a client, KVM provides a series of mounting functions for mounting physical storage devices such as optical disc drive, USB flash drive, hard disks and floppy disk, and for mounting virtual mirror image files such as .iso/.img.

In order to further facilitate use of user, in recent years, KVM also provides a folder mounting function, which means that a folder on the client can be mounted to the server with the KVM of the BMC, such that the client and the server can share a file in the folder.

In conventional technology, generally, the BMC mounts a folder with the KVM based on JAVA. An operator specifies a size for a temporary mirror image file to be generated and a local path where a user stores the temporary mirror image file. The temporary mirror image file having the specified size is generated in the local path of the client, and then a target folder that has the temporary mirror image file format is mounted to the server.

Each time when a folder is to be mounted, before the folder is mounted, the operator has to, according to a size of a to-be-mounted folder, specify a size parameter of the temporary mirror image file to be generated which is not less than the size of the folder, and a path parameter of a local path where the user stores the temporary mirror image file. Such operation is very inconvenient, and is also prone to an operational error, especially for a non-professional operator who does not know what the size parameter and the path parameter represent.

In view of this, how to make the BMC automatically mount a folder with the KVM is an urgent problem to be solved by the person skilled in the art.

SUMMARY

An object of the present disclosure is to provide a method, a device, an apparatus and a computer readable storage medium for a baseboard management controller mounting a folder with KVM. BMC implements one-key mounting folder with KVM, which simplifies a user operation of BMC mounting folder, reduces misoperation, and greatly improves user experience.

To overcome the above technical problem, following technical solutions are provided according to the present disclosure.

In an aspect of the embodiments of the present disclosure, it is provided a method for a baseboard management controller mounting a folder with KVM. The method is based on HTML5 language. The method includes:

calculating a first storage capacity occupied by a to-be-mounted folder selected by a user by traversing the to-be-mounted folder;

calculating a second storage capacity occupied by a mirror image file corresponding to the to-be-mounted folder based on the first storage capacity;

allocating a default storage path for the mirror image file, and obtaining a remaining storage capacity of a disk where the default storage path is located;

determining whether the remaining storage capacity of the disk where the default storage path is located is greater than the second storage capacity;

in a case that the remaining storage capacity of the disk where the default storage path is located is greater than the second storage capacity, mounting the to-be-mounted folder to a server; and in a case that the remaining storage capacity of the disk where the default storage path is located is not greater than the second storage capacity,     displaying a prompt dialog box, for selecting a user storage path for the mirror image file, to the user,     storing the mirror image file according to an inputted user storage path, and     mounting the to-be-mounted folder to the server in a case that a remaining storage capacity of a disk where the user storage path is located is greater than the second storage capacity.

Optionally, the calculating a second storage capacity occupied by a mirror image file corresponding to the to-be-mounted folder based on the first storage capacity includes:

comparing the first storage capacity with $2^n$ with a case that an initial value of n is 1 and n increases by 1 every time, until the first storage capacity is less than $2^k$ for the first time, where n=1, 2, 3, . . . , k, and k is an integer; and taking $2^k$ as the second storage capacity occupied by the mirror image file corresponding to the to-be-mounted folder.

Optionally, the method further includes:

determining whether mounting success information fed back from the server is received; and performing an alarm prompt in a case that the mounting success information fed back from the server is not received.

Optionally, the allocating a default storage path for the mirror image file and obtaining a remaining storage capacity of a disk where the default storage path is located includes:

obtaining a remaining storage capacity of each disk, and determining a disk having a remaining storage capacity greater than a preset capacity as a candidate disk for locating the default storage path; and allocating the default storage path for the mirror image file with the disk where the default storage path is located being the candidate disk, and determining a remaining storage capacity of the disk where the default storage path is located.

In another aspect of the embodiments of the present disclosure, it is provided a device for a baseboard management controller mounting a folder with KVM. The device includes:

a mounting folder size calculation module configured to calculate a first storage capacity occupied by a to-be-mounted folder selected by a user by traversing the to-be-mounted folder;

a mirror image file size calculation module configured to calculate a second storage capacity occupied by a mirror image file corresponding to the to-be-mounted folder based on the first storage capacity;

a path automatic allocation module configured to allocate a default storage path for the mirror image file, and obtain a remaining storage capacity of a disk where the default storage path is located;

a determination module configured to determine whether the remaining storage capacity of the disk where the default storage path is located is greater than the second storage capacity;

a path selection module configured to, in a case that the remaining storage capacity of the disk where the default storage path is located is less than the second storage capacity, display a prompt dialog box, for selecting a user storage path for the mirror image file, to the user, and store the mirror image file according to an inputted user storage path; and a folder mounting module configured to mount the to-be-mounted folder to a server in a case that the remaining storage capacity of the disk where the default storage path is located is greater than the second storage capacity or a remaining storage capacity of a disk where the user storage path is located is greater than the second storage capacity.

Optionally, the mirror image file size calculation module is configured to: compare the first storage capacity with $2^n$ with a case that an initial value of n is 1 and n increases by 1 every time, until the first storage capacity is less than $2^k$ for the first time, where n=1, 2, 3, ..., k, and k is an integer; and take $2^k$ as the second storage capacity occupied by the mirror image file corresponding to the to-be-mounted folder.

Optionally, the device further includes: an alarm module configured to perform an alarm prompt in a case that mounting success information fed back from the server is not received.

Optionally, the path automatic allocation module includes:

a candidate disk determination submodule configured to obtain a remaining storage capacity of each disk, and determine a disk having a remaining storage capacity greater than a preset capacity as a candidate disk for locating the default storage path; and an allocation submodule configured to allocate the default storage path for the mirror image file with the disk where the default storage path is located being the candidate disk, and determine a remaining storage capacity of the disk where the default storage path is located.

An apparatus for a baseboard management controller mounting a folder with KVM is provided according to the embodiments of the disclosure. The apparatus includes: a memory storing computer programs; and a processor configured to execute the computer programs to perform the above method for a baseboard management controller mounting a folder with KVM.

A computer readable storage medium is provided according to the embodiments of the disclosure. The computer readable storage medium stores programs for a baseboard management controller mounting a folder with KVM. The programs, when executed by a processor, cause the processor to perform the above method for a baseboard management controller mounting a folder with KVM.

A method for a baseboard management controller mounting a folder with KVM is provided according to the embodiments of the disclosure. The method is based on HTML5 language. In the method, a first storage capacity occupied by a to-be-mounted folder selected by a user is calculated by traversing the to-be-mounted folder, a second storage capacity occupied by a mirror image file corresponding to the to-be-mounted folder is calculated based on the first storage capacity, a default storage path for the mirror image file is allocated, and it is obtained a remaining storage capacity of a disk where the default storage path is located. In a case that the remaining storage capacity of the disk where the default storage path is located is less than the second storage capacity, a prompt dialog box, for selecting a user storage path for the mirror image file, is displayed to the user, and the mirror image file is stored according to an inputted user storage path. In a case that the remaining storage capacity of the disk where the default storage path is located is greater than the second storage capacity or a remaining storage capacity of a disk where the user storage path is located is greater than the second storage capacity, the to-be-mounted folder is mounted to a server.

The technical solutions provided by the present disclosure have following advantages. In a process that the BMC mounts the folder with HTML5-based KVM, a size of the mirror image file is automatically calculated and the storage path for the mirror image file is automatically allocated. When it is determined that the remaining storage capacity of the disk where the storage path is located is less than the size of the mirror image file, the user is prompted to change the storage path. In this way, it is avoided complicated operations and error-prone operations caused by a case that when the BMC mounts a folder with Java-based KVM, it is needed to manually allocate a size and a storage path of the temporary mirror image file. It is hid the operations of allocating the size and the storage path of the temporary mirror image file, which have high technical requirements and are complicated and error-prone, and are closely integrated with underlying technology. The operations of allocating the size and the storage path of the temporary mirror image file are automatically performed in BMC, thereby greatly simplifying the user operation when the BMC mounts a folder, reducing misoperations, greatly improving the user experience, and implementing a one-key mounting folder function.

In addition, a device, an apparatus and a computer readable storage medium for performing the method for a baseboard management controller mounting a folder with KVM are further provided according to embodiments of the present disclosure, which makes the method more practical. The device, apparatus and computer readable storage medium have advantages which are the same as the advantages of the method.

BRIEF DESCRIPTION OF THE DRAWINGS

For explaining technical solutions according to embodiments of the disclosure or the conventional art more clearly, drawings used in the illustration of the embodiments or the conventional art are described briefly. Apparently, the drawings in the following description show merely some of the embodiments of the disclosure, and other drawings may be obtained based on the drawings by the person skilled in the art without any creative efforts.

DETAILED DESCRIPTION OF THE EMBODIMENTS

In order to make technical solutions according to the disclosure be understood more easier, the embodiments of the present disclosure will be described in detailed in conjunction with the drawings. It is apparent that the described embodiments are only a few rather than all of the embodiments according to the present disclosure. Any other embodiments obtained by the person skilled in the art based on the embodiments in the present disclosure without any creative work fall in the scope of the present disclosure.

The terms "first", "second", "third", "fourth" and the like in the description and the claims and drawings, are used for distinguishing between similar parts and not necessarily for describing a particular order. Furthermore, terms "include", "comprise" or any other variations are intended to cover non-exclusive "include", so that a process, a method, a system, a product or a device including a series of steps or units not only include the steps or units, but also include other steps or units not explicitly listed.

After describing the technical solutions of the embodiments of the disclosure, various non-limiting embodiments of the present application are described in detail below.

Figure 1:
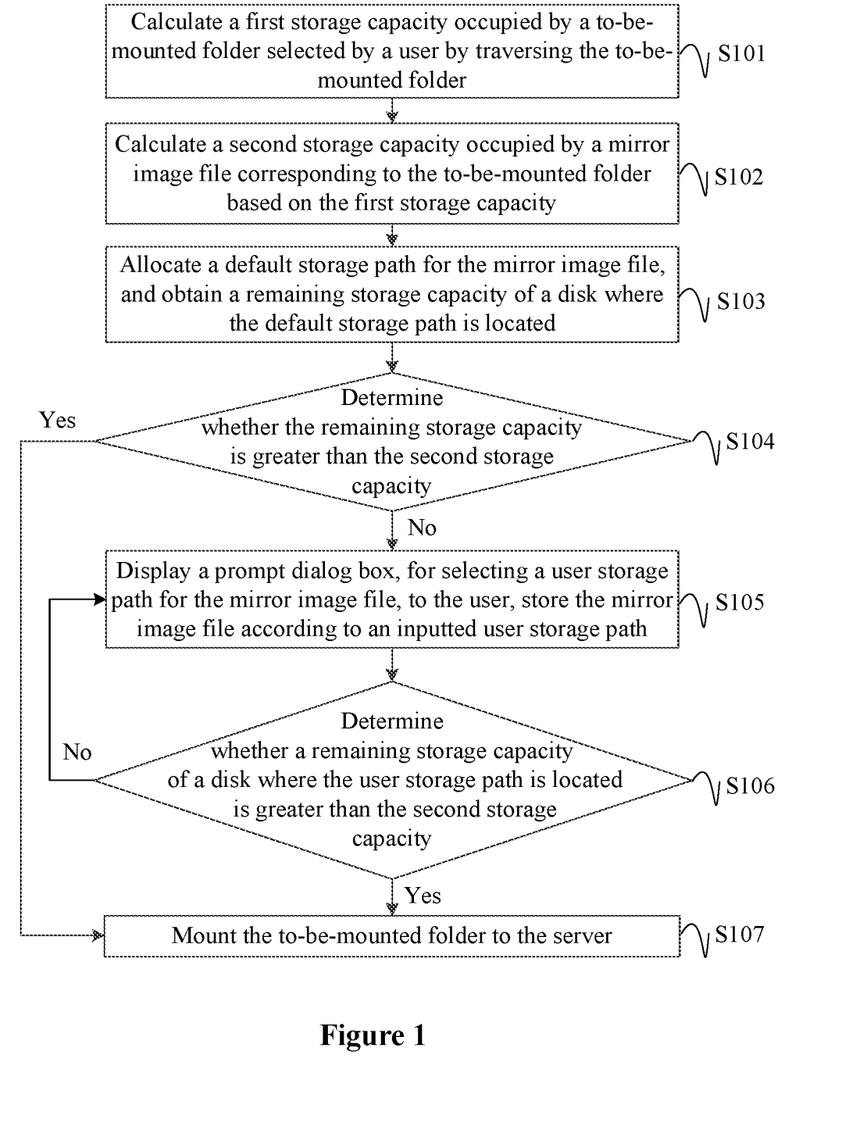
FIG. 1 is a schematic flowchart of a method for a baseboard management controller mounting a folder with KVM according to an embodiment of the present disclosure.
Figure 2:
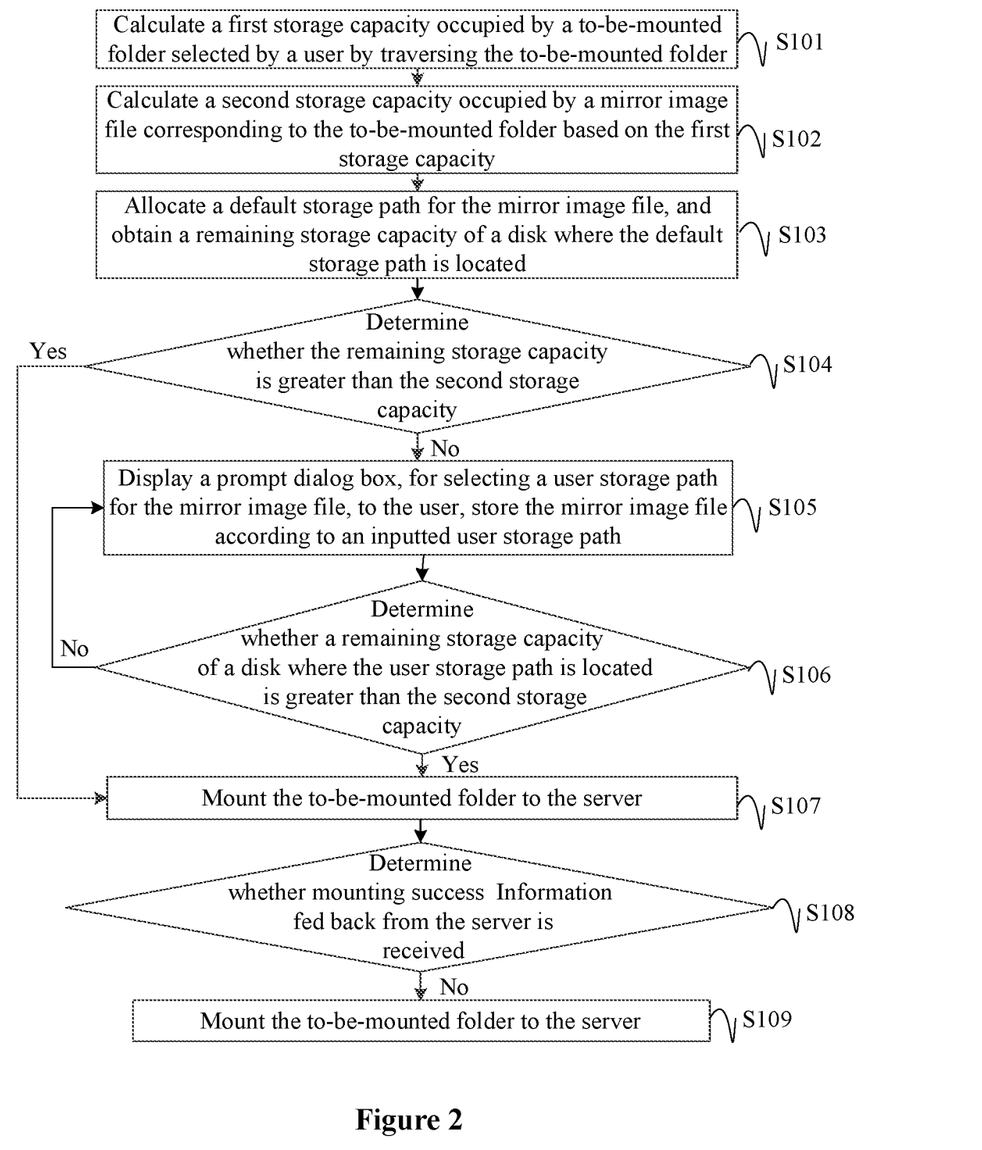
FIG. 2 is a schematic flowchart of a method for a baseboard management controller mounting a folder with KVM according to another embodiment of the present disclosure.

As illustrated in FIG. 2, FIG. 2 is a schematic flowchart of a method for a baseboard management controller mounting a folder with KVM according to an embodiment of the present disclosure. The method includes step S101 to S107.

HTML5 is designed to support multimedia on a mobile device. New grammatical features, such as video, audio, and canvas tags, are introduced to support multimedia on a mobile device. HTML5 also introduces new functions that can change a way a user interact with a document. HTML5 gives a web page a better meaning and structure. Richer tags can be used to build a data-driven Web that is more valuable to programs and the user, with support for RDFa, microdata and microformats. HTML5-based KVM can realize cross-platform application without relying on a Java virtual machine. KVM can be started through Web. It is a more lightweight application with features of high speed and usage convenience.

In step S101, a first storage capacity occupied by a to-be-mounted folder selected by a user is calculated by traversing the to-be-mounted folder.

A system receives an instruction of a user selecting a to-be-mounted folder, and determines the folder (that is, the to-be-mounted folder) to be mounted to a server according to the instruction.

Each file, each subfolder, and each subfile contained in each subfolder of the to-be-mounted folder are traversed, to calculate an actual size of the to-be-mounted folder, i.e., the storage capacity of a disk occupied by the to-be-mounted folder, that is, the first storage capacity. A unit of the first storage capacity may be GB, and of course, it may be other unit.

In step S102, a second storage capacity occupied by a mirror image file corresponding to the to-be-mounted folder is calculated based on the first storage capacity.

The generated mirror image file corresponds to the to-be-mounted folder. The size of the mirror image file is calculated based on the first storage capacity as follows. The first storage capacity is compared with $2^n$ with a case that an initial value of n is 1 and n increases by 1 every time, until the first storage capacity is less than $2^k$ for the first time, n=1, 2, 3, . . . , k, and k is an integer. $2^k$ is taken as the second storage capacity occupied by the mirror image file corresponding to the to-be-mounted folder.

For example, the first storage capacity is 255 GB, take n=1, 2, 3, 4, 5, 6 . . . , in turn, and 255 is compared with $2^n$. In a case that n is 5, 25 is 128. In a case that n is 6, 26 is 256 which is greater than the first storage capacity 255 GB for the first time. The second storage capacity occupied by the mirror image file corresponding to the to-be-mounted folder is 26, i.e., 256 GB.

In step S103, a default storage path is allocated for the mirror image file, and it is obtained a remaining storage capacity of a disk where the default storage path is located.

After the size of the mirror image file is calculated, the system can automatically and randomly allocate a storage path for the mirror image file as the default storage path.

The default storage path is selected to store the mirror image file, and a system function may be called to obtain the remaining storage capacity of the disk where the default storage path is located.

In step S104, it is determined whether the remaining storage capacity of the disk where the default storage path is located is greater than the second storage capacity. In a case that the remaining storage capacity of the disk where the default storage path is located is greater than the second storage capacity, step S107 is performed. In a case that the remaining storage capacity of the disk where the default storage path is located is not greater than the second storage capacity, step S105 is performed.

In step S105, a prompt dialog box, for selecting a user storage path for the mirror image file, is displayed to the user, and the mirror image file is stored according to an inputted user storage path.

In a case that the remaining storage capacity is not greater than the second storage capacity, the system pops up the prompt dialog box for the user to select a storage path for the mirror image file. The user selects the storage path, i.e., the user storage path, for the mirror image file according to requirement and remaining storage capacity of each disk. The user storage path is taken as the storage path for the mirror image file.

In step S106, it is determined whether a remaining storage capacity of a disk where the user storage path is located is greater than the second storage capacity. In a case that the remaining storage capacity of the disk where the user storage path is located is greater than the second storage capacity, step S107 is performed. In a case that the remaining storage capacity of the disk where the user storage path is located is not greater than the second storage capacity, step S105 is performed.

In step S107, the to-be-mounted folder is mounted to the server.

According to the technical solutions provided by the present disclosure, in a process that the BMC mounts the folder with HTML5-based KVM, a size of the mirror image file is automatically calculated and the storage path for the mirror image file is automatically allocated. When it is determined that the remaining storage capacity of the disk where the storage path is located is less than the size of the mirror image file, the user is prompted to change the storage path. In this way, it is avoided complicated operations and error-prone operations caused by a case that when the BMC mounts a folder with Java-based KVM, it is needed to manually allocate a size and a storage path of the temporary mirror image file. It is hid the operations of allocating the size and the storage path of the temporary mirror image file, which have high technical requirements and are complicated and error-prone, and are closely integrated with underlying technology. The operations of allocating the size and the storage path of the temporary mirror image file are automatically performed in BMC, thereby greatly simplifying the user operation when the BMC mounts a folder, reducing misoperations, greatly improving the user experience, and implementing a one-key mounting folder function.

Because the default storage path is allocated randomly, some disks may store more data, and some disks may store less data. Disk storage data is unevenly distributed, such that the system runs poorly or even down. When some disks store more data, a remaining capacity for storing data is not enough to store the mirror image file. In view of this, the process of allocating a default storage path for the mirror image file and obtaining a remaining storage capacity of a disk where the default storage path is located may be implemented as follows. A remaining storage capacity of each disk is obtained, and a disk having a remaining storage capacity greater than a preset capacity is determined as a candidate disk for locating the default storage path. The default storage path for the mirror image file is allocated with the disk where the default storage path is located being the candidate disk, and it is determined a remaining storage capacity of the disk where the default storage path is located.

For example, the remaining storage capacity of each disk may be obtained in advance, and the disks may be ranked in a descending order of the remaining space capacity. A disk in the top position in the rank is taken as the candidate disk.

The number of the candidate disk may be one or more which depends on specific disk usage, mirror image file size, and the preset capacity.

For example, there are five disks. The remaining storage capacities of the five disks are 1 GB, 20 GB, 15 GB, 40 GB and 25 GB respectively. If the preset capacity is 23 GB, there are two candidate disks. If the preset capacity is 30 GB, there is one candidate disk.

The default storage path may be preferentially allocated in a disk which has a large remaining storage capacity, such that subsequent operation of selecting the storage path by the user can be avoided, which is beneficial to simplify user operation and improve user experience.

A folder may not be successfully mounted to the server due to various reasons (such as network error, storage disk replacement), and mounting failure may found when the user intends to use the folder, which may bring great inconvenience to the user. In view of this, based on the above embodiment, another embodiment is provided by the present disclosure as illustrated in FIG. 2. The method in FIG. 2 further includes steps S108 and S109.

In step S108, it is determined whether mounting success information fed back from the server is received. In a case that the mounting success information fed back from the server is not received. Step S109 is performed.

In step S109, an alarm prompt is performed.

The alarm prompt may be performed with any alarm apparatus, such as a buzzer, or with any method or device that can perform an alarm prompt, which is not limited in the present disclosure.

Apparently, after the alarm prompt is performed, the folder may be remounted, that is, the method proceeds to step S107.

When receiving the alarm prompt, the user can timely check the mounting failure to determine an accident cause, and timely process the mounting failure to avoid an unnecessary loss caused by the mounting failure. In this way, it is ensured that the folder is successfully mounted to the server, which is beneficial to improve the work efficiency and improve the user experience.

In an embodiment of the present disclosure, it is provided a device for implementing the method for a baseboard management controller mounting a folder with KVM, which makes the method more practical. The device for a baseboard management controller mounting a folder with KVM provided by the embodiment of the present disclosure is described hereinafter, which may be cross-referenced with the method for a baseboard management controller mounting a folder with KVM described above.

Figure 3:
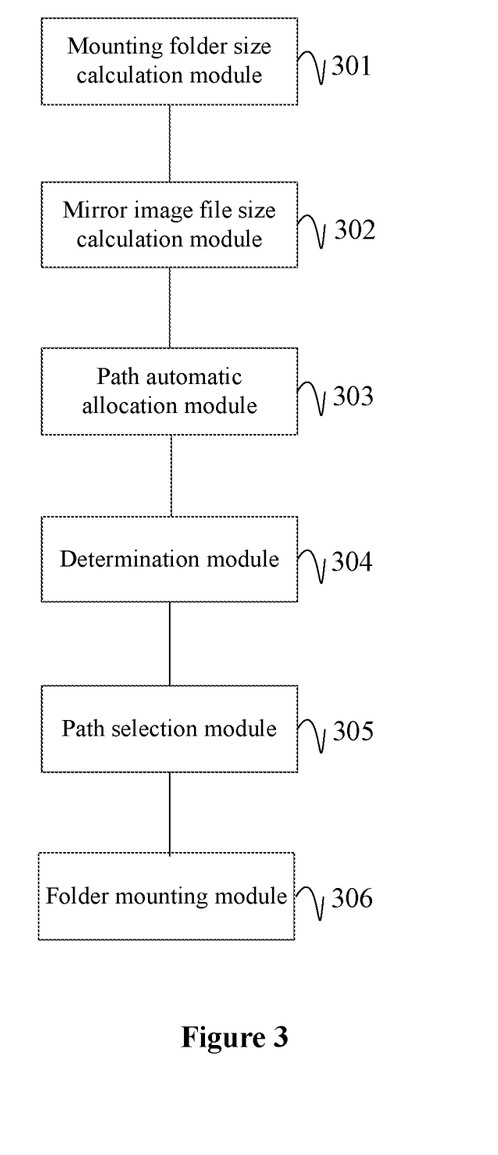
FIG. 3 is a schematic structure view of device for a baseboard management controller mounting a folder with KVM according to an embodiment of the present disclosure.

As illustrated in FIG. 3, FIG. 3 is a schematic structure view of device for a baseboard management controller mounting a folder with KVM according to an embodiment of the present disclosure. The device includes a mounting folder size calculation module 301, a mirror image file size calculation module 302, a path automatic allocation module 303, a determination module 304, a path selection module 305 and a folder mounting module 306.

The mounting folder size calculation module 301 is configured to calculate a first storage capacity occupied by a to-be-mounted folder selected by a user by traversing the to-be-mounted folder.

The mirror image file size calculation module 302 is configured to calculate a second storage capacity occupied by a mirror image file corresponding to the to-be-mounted folder based on the first storage capacity.

The path automatic allocation module 303 is configured to allocate a default storage path for the mirror image file, and obtain a remaining storage capacity of a disk where the default storage path is located.

The determination module 304 is configured to determine whether the remaining storage capacity of the disk where the default storage path is located is greater than the second storage capacity.

The path selection module 305 is configured to, in a case that the remaining storage capacity of the disk where the default storage path is located is less than the second storage capacity, display a prompt dialog box, for selecting a user storage path for the mirror image file, to the user, and store the mirror image file according to an inputted user storage path.

The folder mounting module 306 is configured to mount the to-be-mounted folder to a server in a case that the remaining storage capacity of the disk where the default storage path is located is greater than the second storage capacity or a remaining storage capacity of a disk where the user storage path is located is greater than the second storage capacity.

Figure 4:
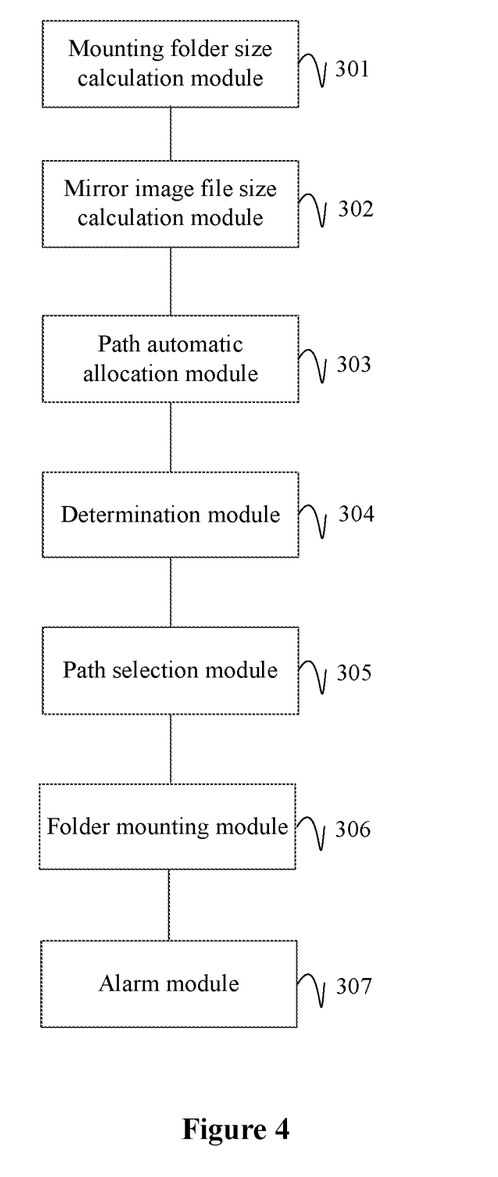
FIG. 4 is a schematic structure view of device for a baseboard management controller mounting a folder with KVM according to another embodiment of the present disclosure.

Optionally, in some embodiments, as illustrated in FIG. 4, the device may further include an alarm module 307 configured to perform an alarm prompt in a case that mounting success information fed back from the server is not received.

In some embodiments, the mirror image file size calculation module 302 is configured to: compare the first storage capacity with $2^n$ with a case that an initial value of n is 1 and n increases by 1 every time, until the first storage capacity is less than $2^k$ for the first time, where n=1, 2, 3, . . . , k, and k is an integer; and take $2^k$ as the second storage capacity occupied by the mirror image file corresponding to the to-be-mounted folder.

In some embodiments, the path automatic allocation module 303 includes a candidate disk determination submodule and an allocation submodule.

The candidate disk determination submodule is configured to obtain a remaining storage capacity of each disk, and determine a disk having a remaining storage capacity greater than a preset capacity as a candidate disk for locating the default storage path.

The allocation submodule is configured to allocate the default storage path for the mirror image file with the disk where the default storage path is located being the candidate disk, and determine a remaining storage capacity of the disk where the default storage path is located.

The function of each function module of the device for a baseboard management controller mounting a folder with KVM in the embodiment of the present disclosure may be specifically implemented according to the method in the foregoing method embodiments, and the related description of the foregoing method embodiments may be referred for the specific implementation process of the device, which is not repeated herein.

It can be seen that, according to the embodiments in the present disclosure, in a process that the BMC mounts the folder with HTML5-based KVM, a size of the mirror image file is automatically calculated and the storage path for the mirror image file is automatically allocated. When it is determined that the remaining storage capacity of the disk where the storage path is located is less than the size of the mirror image file, the user is prompted to change the storage path. In this way, it is avoided complicated operations and error-prone operations caused by a case that when the BMC mounts a folder with Java-based KVM, it is needed to manually allocate a size and a storage path of the temporary mirror image file. It is hid the operations of allocating the size and the storage path of the temporary mirror image file, which have high technical requirements and are complicated and error-prone, and are closely integrated with underlying technology. The operations of allocating the size and the storage path of the temporary mirror image file are automatically performed in BMC, thereby greatly simplifying the user operation when the BMC mounts a folder, reducing misoperations, greatly improving the user experience, and implementing a one-key mounting folder function.

According to an embodiment of the disclosure, it is provided an apparatus for a baseboard management controller mounting a folder with KVM. The apparatus includes a memory and a processor. The memory stores computer programs. The processor is configured to execute the computer programs to perform the method for a baseboard management controller mounting a folder with KVM according to any one of above embodiments.

The function of each function module of the apparatus for a baseboard management controller mounting a folder with KVM in the embodiment of the present disclosure may be specifically implemented according to the method in the foregoing method embodiments, and the related description of the foregoing method embodiments may be referred for the specific implementation process of the apparatus, which is not repeated herein.

It can be seen that, according to the embodiments in the present disclosure, BMC implements one-key mounting folder with KVM, which simplifies a user operation of BMC mounting folder, reduces misoperation, and greatly improves user experience.

According to an embodiment of the disclosure, it is provided a computer readable storage medium storing programs for a baseboard management controller mounting a folder with KVM. The programs, when executed by a processor, cause the processor to perform the method for a baseboard management controller mounting a folder with KVM according to any one of above embodiments.

The function of each function module of the computer readable storage medium in the embodiment of the present disclosure may be specifically implemented according to the method in the foregoing method embodiments, and the related description of the foregoing method embodiments may be referred for the specific implementation process of the computer readable storage medium, which is not repeated herein.

It can be seen that, according to the embodiments in the present disclosure, BMC implements one-key mounting folder with KVM, which simplifies a user operation of BMC mounting folder, reduces misoperation, and greatly improves user experience.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application, such implementation should not be considered to be beyond the scope of the present disclosure.

The steps of the method or algorithm described in connection with the embodiments disclosed herein may be implemented directly in hardware, software modules executed by a processor, or a combination of both. The software module can be placed in random access memory (RAM), memory, read only memory (ROM), electrically programmable ROM, electrically erasable programmable ROM, registers, hard disk, removable disk, CD-ROM, or any other form of storage medium known in technical field.

The method, device, apparatus and computer readable storage medium for a baseboard management controller mounting a folder with KVM provided by the present disclosure are described in detail above. The principles and implementations of the present disclosure are described herein with specific embodiments. The above description of embodiments is only intended to help the understanding of the method and the concept of the present disclosure. It should be noted that, for the person skilled in the art, many modifications and improvements may be made to the present disclosure without departing from the principle of the present disclosure, and these modifications and improvements also fall into the protection scope of the present disclosure defined by the claims.

The invention claimed is:

1. A method for a baseboard management controller mounting a folder with Keyboard Video Mouse (KVM), the method being based on HTML5 language, the method comprising:
   calculating a first storage capacity occupied by a to-be-mounted folder in a local computer selected by a user by traversing the to-be-mounted folder;
   calculating a second storage capacity occupied by a mirror image file corresponding to the to-be-mounted folder based on the first storage capacity;
   allocating a default storage path for the mirror image file in the local computer, and obtaining a remaining storage capacity of a disk of the local computer where the default storage path is located;
   determining whether the remaining storage capacity of the disk of the local computer where the default storage path is located is greater than the second storage capacity;
   in a case that the remaining storage capacity of the disk of the local computer where the default storage path is located is greater than the second storage capacity, mounting the to-be-mounted folder to a server; and
   in a case that the remaining storage capacity of the disk of the local computer where the default storage path is located is not greater than the second storage capacity,
      displaying a prompt dialog box, for selecting a user storage path for the mirror image file in the local computer, to the user,
      storing the mirror image file in the local computer according to an inputted user storage path, and
      mounting the to-be-mounted folder to the server in a case that a remaining storage capacity of a disk of the local computer where the user storage path is located is greater than the second storage capacity.

2. The method for a baseboard management controller mounting a folder with KVM according to claim 1, wherein the calculating a second storage capacity occupied by a mirror image file corresponding to the to-be-mounted folder based on the first storage capacity comprises:
   comparing the first storage capacity with $2^n$ with a case that an initial value of n is 1 and n increases by 1 every time, until the first storage capacity is less than $2^k$ for the first time, wherein $n=1, 2, 3, \ldots, k$, and k is an integer; and
   taking $2^k$ as the second storage capacity occupied by the mirror image file corresponding to the to-be-mounted folder.

3. The method for a baseboard management controller mounting a folder with KVM according to claim 2, further comprising:
   determining whether mounting success information fed back from the server is received; and
   performing an alarm prompt in a case that the mounting success information fed back from the server is not received.

4. The method for a baseboard management controller mounting a folder with KVM according to claim 1, wherein the allocating a default storage path for the mirror image file in the local computer and obtaining a remaining storage capacity of a disk of the local computer where the default storage path is located comprises:
   obtaining a remaining storage capacity of each disk of the local computer, and determining a disk of the local computer having a remaining storage capacity greater than a preset capacity as a candidate disk for locating the default storage path; and
   allocating the default storage path for the mirror image file with the disk of the local computer where the default storage path is located being the candidate disk, and determining a remaining storage capacity of the disk of the local computer where the default storage path is located.

5. A device for a baseboard management controller mounting a folder with Keyboard Video Mouse (KVM), the device comprising:
   a mounting folder size calculation module configured to calculate a first storage capacity occupied by a to-be-mounted folder in a local computer selected by a user by traversing the to-be-mounted folder;
   a mirror image file size calculation module configured to calculate a second storage capacity occupied by a mirror image file corresponding to the to-be-mounted folder based on the first storage capacity;
   a path automatic allocation module configured to allocate a default storage path for the mirror image file in the local computer, and obtain a remaining storage capacity of a disk of the local computer where the default storage path is located;
   a determination module configured to determine whether the remaining storage capacity of the disk of the local computer where the default storage path is located is greater than the second storage capacity;
   a path selection module configured to, in a case that the remaining storage capacity of the disk of the local computer where the default storage path is located is less than the second storage capacity, display a prompt dialog box, for selecting a user storage path for the mirror image file in the local computer, to the user, and store the mirror image file in the local computer according to an inputted user storage path; and
   a folder mounting module configured to mount the to-be-mounted folder to a server in a case that the remaining storage capacity of the disk of the local computer where the default storage path is located is greater than the second storage capacity or a remaining storage capacity of a disk of the local computer where the user storage path is located is greater than the second storage capacity.

6. The device for a baseboard management controller mounting a folder with KVM according to claim 5, wherein the mirror image file size calculation module is configured to:
   compare the first storage capacity with $2^n$ with a case that an initial value of n is 1 and n increases by 1 every time, until the first storage capacity is less than $2^k$ for the first time, wherein $n=1, 2, 3, \ldots, k$, and k is an integer; and
   take $2^k$ as the second storage capacity occupied by the mirror image file corresponding to the to-be-mounted folder.

7. The device for a baseboard management controller mounting a folder with KVM according to claim 6, further comprising:
   an alarm module configured to perform an alarm prompt in a case that mounting success information fed back from the server is not received.

8. The device for a baseboard management controller mounting a folder with KVM according to claim 7, wherein the path automatic allocation module comprises:
   a candidate disk determination submodule configured to obtain a remaining storage capacity of each disk of the local computer, and determine a disk of the local computer having a remaining storage capacity greater than a preset capacity as a candidate disk for locating the default storage path; and
   an allocation submodule configured to allocate the default storage path for the mirror image file with the disk of the local computer where the default storage path is located being the candidate disk, and determine a remaining storage capacity of the disk of the local computer where the default storage path is located.

9. An apparatus for a baseboard management controller mounting a folder with Keyboard Video Mouse (KVM), comprising:
   a memory storing computer programs; and
   a processor configured to execute the computer programs to perform the method for a baseboard management controller mounting a folder with KVM according to claim 1.

10. A computer readable storage medium storing programs for a baseboard management controller mounting a folder with Keyboard Video Mouse (KVM), wherein the programs, when executed by a processor, cause the processor to perform a method for a baseboard management controller mounting a folder with KVM, the method is based on HTML5 language, the method comprises:
   calculating a first storage capacity occupied by a to-be-mounted folder in a local computer selected by a user by traversing the to-be-mounted folder;
   calculating a second storage capacity occupied by a mirror image file corresponding to the to-be-mounted folder based on the first storage capacity;
   allocating a default storage path for the mirror image file in the local computer, and obtaining a remaining storage capacity of a disk of the local computer where the default storage path is located;
   determining whether the remaining storage capacity of the disk of the local computer where the default storage path is located is greater than the second storage capacity;
   in a case that the remaining storage capacity of the disk of the local computer where the default storage path is located is greater than the second storage capacity, mounting the to-be-mounted folder to a server; and
   in a case that the remaining storage capacity of the disk of the local computer where the default storage path is located is not greater than the second storage capacity,
      displaying a prompt dialog box, for selecting a user storage path for the mirror image file in the local computer, to the user,
      storing the mirror image file in the local computer according to an inputted user storage path, and
      mounting the to-be-mounted folder to the server in a case that a remaining storage capacity of a disk of the local computer where the user storage path is located is greater than the second storage capacity.

11. The method for a baseboard management controller mounting a folder with KVM according to claim 2, wherein the allocating a default storage path for the mirror image file in the local computer and obtaining a remaining storage capacity of a disk of the local computer where the default storage path is located comprises:
   obtaining a remaining storage capacity of each disk of the local computer, and determining a disk of the local computer having a remaining storage capacity greater than a preset capacity as a candidate disk for locating the default storage path; and
   allocating the default storage path for the mirror image file with the disk of the local computer where the default storage path is located being the candidate disk, and determining a remaining storage capacity of the disk of the local computer where the default storage path is located.

12. The method for a baseboard management controller mounting a folder with KVM according to claim 3, wherein the allocating a default storage path for the mirror image file in the local computer and obtaining a remaining storage capacity of a disk of the local computer where the default storage path is located comprises:
   obtaining a remaining storage capacity of each disk of the local computer, and determining a disk of the local computer having a remaining storage capacity greater than a preset capacity as a candidate disk for locating the default storage path; and
   allocating the default storage path for the mirror image file with the disk of the local computer where the default storage path is located being the candidate disk, and determining a remaining storage capacity of the disk of the local computer where the default storage path is located.

* * * * *